Figure 2:
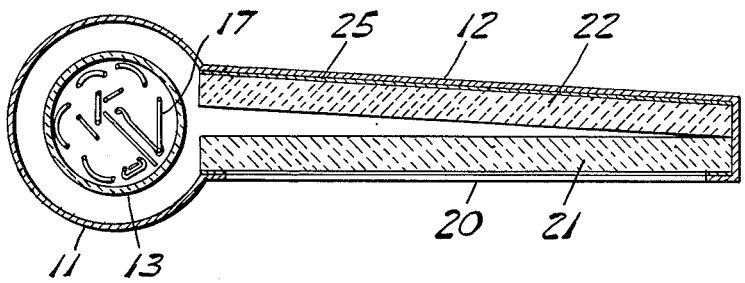

June 4, 1963   J. J. McMACKIN ET AL   3,092,728
LIGHT COLLECTING APPARATUS FOR PHOTOSENSITIVE DEVICE
Filed March 15, 1961

INVENTORS
John J. McMackin &
Miller J. Paruolo
by Christel & Bean
ATTORNEYS

3,092,728
LIGHT COLLECTING APPARATUS FOR PHOTOSENSITIVE DEVICE
John J. McMackin and Miller J. Paruolo, Brockway, Pa., assignors to Brockway Glass Company, Inc., Brockway, Pa.
Filed Mar. 15, 1961, Ser. No. 95,891
8 Claims. (Cl. 250—239)

This invention relates to a photosensitive device which is responsive to variations in the light level or degree of illumination which impinges upon a light-receiving surface.

Speaking generally, the present invention provides novel means for receiving light energy against a surface and for transmitting and converging such light energy to direct the same against a photosenstive electrical means which is relatively much smaller than the collecting surface, such as a photo-multiplier tube or other photoelectric cell. The broad idea of converging light to direct the same against a photo-responsive element is not new but the arrangement proposed herein is markedly different from prior art light gathering arrangements wherein light from a predetermined area and direction is brought to bear upon a photosensitive electrical means.

The arrangement of the present invention requires no optical components in the usual sense, such as lenses or the like, and no focusing or other adjustment is necessary to produce the desired light gathering function. Accordingly the apparatus is not only simple and inexpensive to manufacture but is relatively foolproof and not subject to becoming misadjusted in use. Further the arrangement of the present invention is such that the entire device occupies a very small compass and no provisions for the depth usually required for producing foci need be made.

The light gathering instrumentalities which direct the light to the relatively small photosensitive electrical component comprise simple flat pieces of translucent glass or analogous material. The surface which is presented for light reception may be rectangular and is of substantial extent in both directions. The present optical arrangement is such that light received thereon need not be oriented or localized with respect to the receiving surface. Light striking a marginal or corner portion of the receiving surface will produce the same general end result on the photocell as the same amount of light striking the surface more centrally.

Furthermore, the device of the present invention is directional to a certain degree since only light striking the planar surface of the front glass face of the device is transmitted to the photocell. However, light striking such surface at various angles will be transmitted to the interior and will thus register its effect on the photocell.

Speaking generally, the device of the present invention comprises a pair of glass plates arranged to form a sharp V or wedge with a photocell arranged in or adjacent to the open end of the V or wedge. One of the glass plates comprises an outer plate or face for receiving light while the other has an opaque backing. Some of the light passing through the outer plate is received and refracted and reflected by the backed plate and the facing surfaces of the two plates glow to a greater or lesser degree in proportion to the light received on the outer surface of the outer plate.

These glowing surfaces radiate light to the photocell in a foreshortened manner as a rectangle of light whose width approximates the spacing of the glass plates at the open end of the V or wedge. The photocell is oriented so that its most sensitive face is directed into the V or wedge between the glass plates and thus a maximum light impulse on the photocell is derived from the light received on the front of the outer plate, which light may be predominantly on any part of the plate or may be more or less distributed thereover.

A single specific embodiment of the principles of the present invention is illustrated in the accompanying drawing and described in detail in the following specification. However, it is to be understood that such embodiment is set forth by way of example only and that the principles of the present invention are not limited thereto nor otherwise than as defined in the appended claims.

Figure 1:
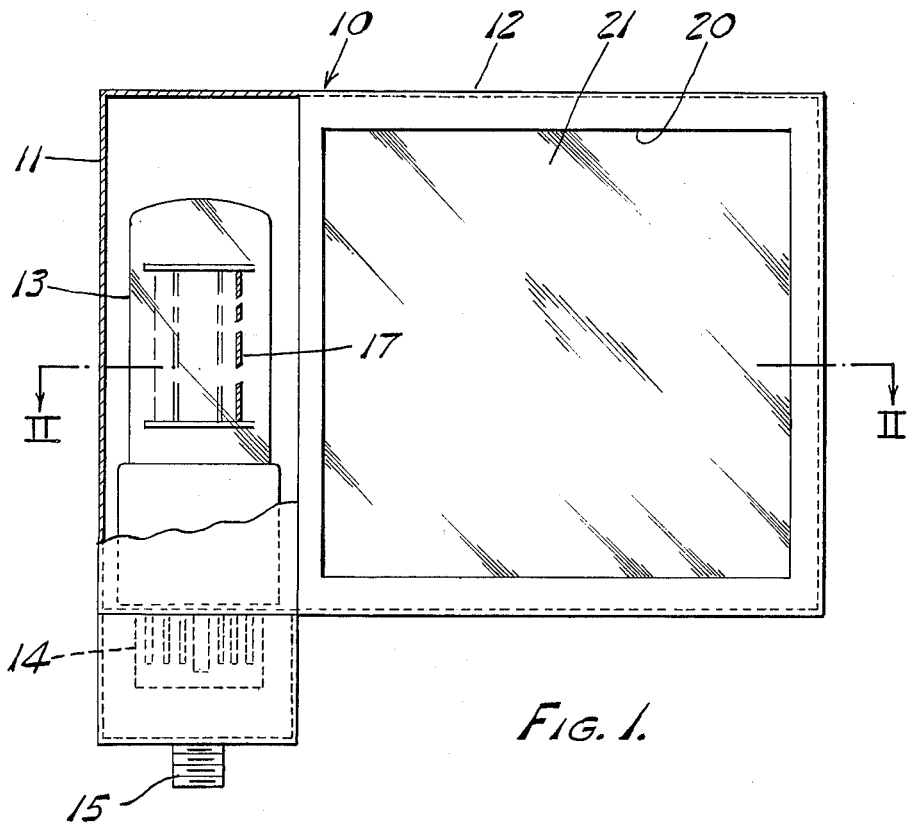

In the drawing:

FIG. 1 is an elevational view of one form of the light collecting and translating arrangement of the present invention; and FIG. 2 is a cross-sectional view taken approximately on the line II—II of FIG. 1.

In the drawing like characters of reference denote like parts and the numeral 10 designates generally a casing of sheet metal or plastic material which includes a hollow cylindrical portion 11 and a generally rectangular somewhat wedge-shaped portion 12 extending laterally or radially therefrom.

The cylindrical portion 11 of the casing houses a light sensitive electronic tube 13, preferably of the so-called photo-multiplier type, the lower portion of cylindrical casing 11 being adapted to contain an appropriate socket 14 for supporting the tube 13 in an upright coaxial position within cylindrical casing 11.

The usual leads from the socket 14 may pass outwardly of the casing by way of a conduit 15 and the manner in which the photo-multiplier tube is connected electrically to utilize the photosensitive variable output voltage of the photo-multiplier tube is entirely conventional in the electronic art. The connection to the conduit 15 may serve as a single point support for the entire device.

In the drawing the numeral 17 designates somewhat schematically the light sensitive element of photo-multiplier tube 13 and it will be noted that the same, being somewhat directional, is oriented to face the wedge-shaped rectangular casing portion 12 and lies substantially in registry with a medial plane through such casing.

The casing portion 12 contains a window opening 20 at one of its flat faces and is closed at its opposite face and is adapted to support a pair of flat glass plates 21 and 22 each of which in the present specific example is of milk glass, or what is technically known as white opal glass. It is to be understood that other forms of glass having similarly diffusive optical characteristics may be employed.

One of the glass plates, that designated 21, is disposed directly behind the window opening 20 and the other glass plate 22 is disposed against the opposite closed wall of casing portion 12. A layer of opaque or reflective material is indicated in FIG. 2 by the numeral 25 and the same may be applied as a coating to the rear surface of glass plate 22 or may comprise a separate sheet of reflective or opaque material or may be applied to the contiguous interior surface of the rear wall of portion 12. The right hand end faces of the plates 21 and 22, as viewed in FIG. 2, may also be rendered opaque or be provided with a mirror surface to redirect light diffused toward the same back to the left as viewed in FIG. 2.

Light striking the outer or front face of plate 21 is diffused therein and causes the interior face thereof to glow. A certain amount of the light passes to the other plate 22 and is diffused therein so that the interior surface of the plate also glows. Light tending to pass through this other plate, the rear plate 22, is redirected to its inner surface, that is the surface facing the outer or front plate 21. Light within the wedge thus formed is variously reflected, refracted and radiated in a direction generally to the left as viewed in FIG. 2, toward the photocell 13. Light is thus directed to element 17 mainly through the acute V-shaped air space between the glass plates 21 and 22 but also comes to the element 17 from the left hand edges of such plates, as viewed in FIG. 2.

We claim:

1. Light sensitive means comprising a photocell sensitive to light impinging radially thereagainst, a generally cylindrical casing for said cell, and frame means comprising a radial extension of said cylindrical casing, said frame means having opposed relatively flat front and rear walls defining a light receiving area of substantial height and width, said front wall comprising an open frame and said front and rear walls being disposed at an acute angle having its vertex at the outer end of said extension, a flat plate of diffusing glass in said open frame front wall and a flat plate of diffusing glass against said rear wall, and opaque means at the rear side of said second flat plate for light reflectance, whereby light impinging externally on said front plate is diffused therein and transmitted to the space between said plates and thence reflected and refracted toward said cell so that light impinging on the entire area of the front plate is transmitted to said cell concentrated to a relatively narrow rectangle of light extending parallel to the axis of said cell.

2. Light sensitive means comprising a photocell sensitive to light impinging radially thereagainst, a generally cylindrical casing for said cell, and frame means comprising a radial extension of said cylindrical casing, said frame means having opposed relatively flat front and rear walls defining a light receiving area of substantial height and width, said front wall comprising an open frame and said front and rear walls being disposed at an acute angle having it vertex at the outer end of said extension, a flat plate of diffusing glass in said open frame front wall and a flat plate of diffusing glass against said rear wall, whereby light impinging externally on said front plate is diffused therein and transmitted to the space between said plates and thence reflected and refracted between said plates toward said cell so that light impinging on the entire area of the front plate is transmitted to said cell concentrated to a relatively narrow rectangle of light extending parallel to the axis of said cell.

3. Light sensitive means comprising a photocell sensitive to light impinging radially thereagainst, an elongated casing for said cell, and frame means comprising a lateral extension of said elongated casing, said frame means having opposed relatively flat front and rear walls defining a light receiving area of substantial height and width, said front wall comprising an open frame and said front and rear walls being disposed at an acute angle having its vertex at the outer end of said extension, a flat plate of diffusing glass in said open frame front wall and a flat plate of diffusing glass against said rear wall, and opaque means at the rear side of said second flat plate for light reflectance, whereby light impinging externally on said front plate is diffused therein and transmitted to the space between said plates and thence reflected and refracted toward said cell so that light impinging on the entire area of the front plate is transmitted to said cell concentrated to a relatively narrow rectangle of light extending parallel to the axis of said cell.

4. Light sensitive means comprising a photocell sensitive to light impinging radially thereagainst, an elongated casing for said cell, and frame means comprising a lateral extension of said elongated casing, said frame means having opposed relatively flat front and rear walls defining a light receiving area of substantial height and width, said front wall comprising an open frame and said front and rear walls being disposed at an acute angle having its vertex at the outer end of said extension, a flat plate of diffusing glass in said open frame front wall and a flat plate of diffusing glass against said rear wall, whereby light impinging externally on said front plate is diffused therein and transmitted to the space between said plates and thence reflected and refracted between said plates toward said cell so that light impinging on the entire area of the front plate is transmitted to said cell concentrated to a relatively narrow rectangle of light extending parallel to the axis of said cell.

5. Light sensitive means comprising a photocell sensitive to light impinging radially thereagainst, a generally cylindrical casing for said cell, and frame means comprising a radial extension of said cylindrical casing, said frame means having opposed relatively flat front and rear walls defining a light receiving area of substantial height and width, said front wall comprising an open frame and said front and rear walls being disposed at an acute angle having its vertex at the outer end of said extension, a flat plate of diffusing glass in said open frame front wall and a flat plate of glass comprising a mirror surface against said rear wall, whereby light impinging externally on said front plate is diffused therein and transmitted to the space between said plates and is thence reflected and refracted between said plates and radiated toward said cell so that light impinging on the entire area of the front plate is transmitted to said cell concentrated to a relatively narrow rectangle of light extending parallel to the axis of said cell.

6. Light sensitive means comprising a photocell sensitive to light impinging radially thereagainst, an elongated casing for said cell, and frame means comprising a lateral extension of said elongated casing, said frame means having opposed relatively flat front and rear walls defining a light receiving area of substantial height and width, said front wall comprising an open frame and said front and rear walls being disposed at an acute angle having its vertex at the outer end of said extension, a flat plate of diffusing glass in said open frame front wall and a flat plate of glass comprising a mirror surface against said rear wall, whereby light impinging externally on said front plate is diffused therein and transmitted to the space between said plates and is thence reflected and refracted between said plates and radiated toward said cell so that light impinging on the entire area of the front plate is transmitted to said cell concentrated to a relatively narrow rectangle of light extending parallel to the axis of said cell.

7. Light sensitive means comprising an elongated photo-multiplier tube having a radially exposed light sensitive element, a casing for said tube, and frame means comprising a lateral extension of said casing, said frame means having a pair of flat plates of diffusing glass forming an acute angle having its vertex at the outer end of said extension, said frame means having an opening exposing one of said plates to form a light receiving surface, and opaque means at the outer side of the other plate for light reflectance, whereby light impinging externally on said one plate is diffused therein and transmitted to the space between said plates and thence reflected and refracted toward the light sensitive element of said photomultiplier tube.

8. Light sensitive means comprising an elongated photo-multiplier tube having a radially exposed light sensitive element, a casing for said tube, and frame means comprising a lateral extension of said casing, said frame means having a pair of flat plates of diffusing glass forming an acute angle having its vertex at the outer end of said extension, said frame means having an opening exposing one of said plates to form a light receiving surface, whereby light impinging externally on said one plate is diffused therein and transmitted to the space between said plates and thence reflected and refracted toward the light sensitive element of said photo-multiplier tube.

References Cited in the file of this patent

UNITED STATES PATENTS

| | | |
|---|---|---|
| 2,674,700 | Small | Apr. 6, 1954 |
| 2,931,905 | Caha et al. | Apr. 5, 1960 |
| 2,945,958 | Morris | July 19, 1960 |
| 2,952,781 | Hersh | Sept. 13, 1960 |
| 2,984,747 | Walker | May 16, 1961 |